(12) United States Patent
Parkinson (10) Patent No.: US 7,814,315 B2
(45) Date of Patent: Oct. 12, 2010

(54) PROPAGATION OF CERTIFICATE REVOCATION INFORMATION

(75) Inventor: Steven W. Parkinson, San Jose, CA (US)

(73) Assignee: Red Hat, Inc., Raleigh, NC (US)

(*) Notice: Subject to any disclaimer, the term of this patent is extended or adjusted under 35 U.S.C. 154(b) by 986 days.

(21) Appl. No.: 11/607,215

(22) Filed: Nov. 30, 2006

(65) Prior Publication Data
US 2008/0133907 A1    Jun. 5, 2008

(51) Int. Cl.
H04L 29/06    (2006.01)
H04L 9/32     (2006.01)
G06F 7/04     (2006.01)

(52) U.S. Cl. .................. 713/158; 713/156; 713/157; 713/168; 726/10

(58) Field of Classification Search ......... 713/156–158, 713/168; 726/10
See application file for complete search history.

(56) References Cited

U.S. PATENT DOCUMENTS

| | | | |
|---|---|---|---|
| 5,699,431 A | 12/1997 | Van Oorschot et al. | |
| 6,397,329 B1* | 5/2002 | Aiello et al. | 713/155 |
| 7,337,315 B2 | 2/2008 | Micali | |
| 7,500,100 B1 | 3/2009 | Kobozev et al. | |
| 7,526,644 B2 | 4/2009 | Kocher | |
| 2003/0220946 A1* | 11/2003 | Malik | 707/203 |
| 2004/0111607 A1 | 6/2004 | Yellepeddy | |
| 2005/0154879 A1 | 7/2005 | Engberg et al. | |
| 2005/0193204 A1 | 9/2005 | Engberg et al. | |
| 2006/0143136 A1* | 6/2006 | Low et al. | 705/64 |
| 2006/0288224 A1* | 12/2006 | Won et al. | 713/181 |
| 2007/0260589 A1* | 11/2007 | Yugami | 707/3 |
| 2007/0294526 A1* | 12/2007 | Medvinsky et al. | 713/158 |

OTHER PUBLICATIONS

Red Hat, Inc. Office Action for U.S. Appl. No. 11/607,563 mailed Dec. 8, 2009.

* cited by examiner

*Primary Examiner*—Aravind K Moorthy
(74) *Attorney, Agent, or Firm*—Blakely, Sokoloff, Taylor & Zafman LLP (57) ABSTRACT

A method and apparatus for propagating certificate revocation information. A certificate revocation list is received that includes a plurality of entries. The plurality of entries are grouped other than by order of appearance in the certificate revocation list. Certification statements are generated based on the grouped entries.

31 Claims, 9 Drawing Sheets

PROPAGATION OF CERTIFICATE REVOCATION INFORMATION

TECHNICAL FIELD

Embodiments of the present invention relate to propagation of certificate revocation information, and more specifically to grouping certificates for OCSP responses.

BACKGROUND

In cryptographic systems such as a public key infrastructure (PKI), certificates can be used to encrypt messages such that only a holder of a specific certificate can read the message, and to digitally sign information to prove that the certificate holder is the source of the information. Digital signatures provide an effective, universally verifiable form of authentication. As in any system, a PKI is subject to security breaches.

Digital certificates facilitate the use of digital signatures by providing a guarantee that a particular public key belongs to a specific identity and, therefore, ensuring that the public key can be used to verify the signature. Digital certificates include a unique certificate serial number, a public key, and a user's name, bound together by a certificate authority's (CA's) digital signature. Many types of digital certificates are used, such as email certificates, encryption certificates, signing certificates, and so on.

A digital certificate is associated with a unique public key pair having a unique private key and a unique public key. When a third party obtains a copy of the unique private key, the certificate associated with it becomes compromised. To mitigate the security breach that occurs when a certificate is compromised, CAs publish certificate revocation lists (CRLs) that indicate which certificates can still be trusted.

There are three conventional methods by which certificate revocation information is propagated to clients. In a first conventional method, clients download CRLs directly from certificate authorities. In a second conventional method, an online certificate status protocol (OCSP) is used to distribute certificate revocation information to clients.

Figure 1:
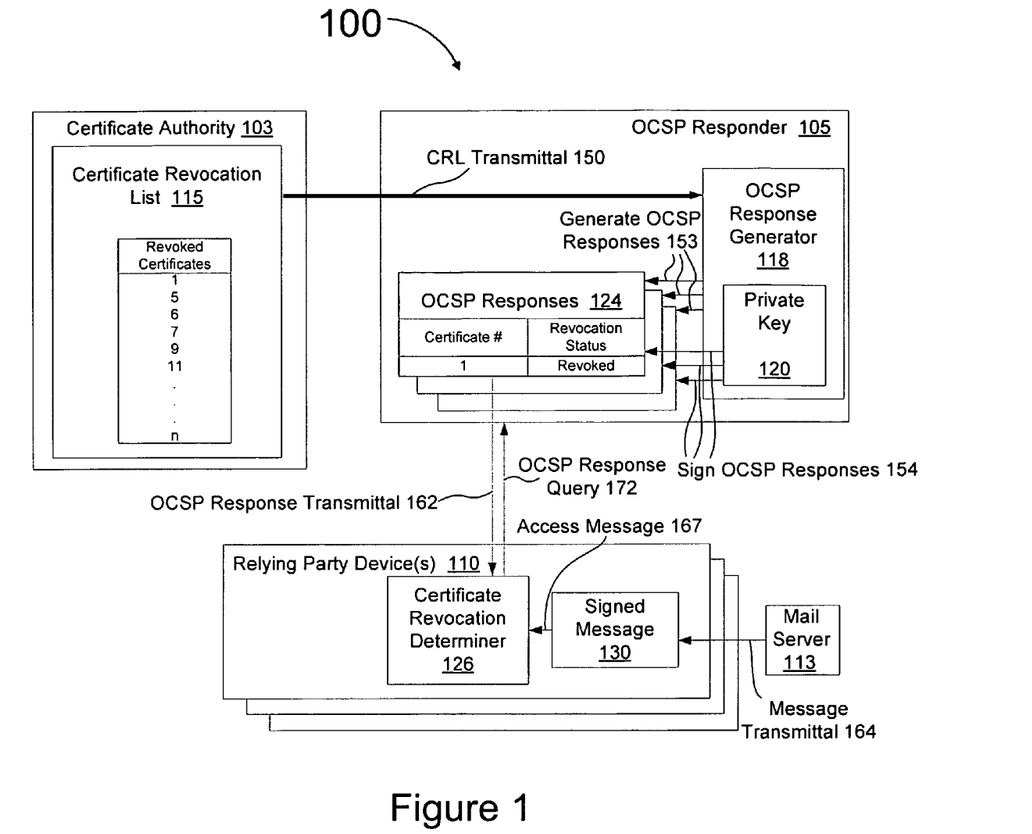
FIG. 1 illustrates a block diagram of a conventional PKI architecture.

FIG. 1 illustrates a conventional PKI architecture 100 for propagating certificate revocation information to clients according to the second conventional method. A certificate authority (CA) 103 generates a CRL 115 and transmits it 150 to an OCSP responder 105. The OCSP responder 105 is a secure server that has authority granted to it by the CA 103 to generate OCSP responses 124.

A relying party device 110 receives a message transmittal 164 from a mail server 113, the contents of which include a signed message 130. A certificate revocation determiner 126 residing on the relying party device 110 accesses the signed message 130 to check whether a certificate that was used to generate a cryptographic signature for the signed message 130 has been revoked. This is accomplished by sending an OCSP response query 172 to the OCSP responder 105.

Upon receiving the OCSP response query 172 for a particular certificate from the relying party device 110, the OCSP responder 105 generates one or more OCSP responses 153 with an OCSP response generator 118 according to the CRL 115. The OCSP response indicates whether the certificate for which the OCSP response was requested has been revoked. Each OCSP response relates to only a single certificate, and must be digitally signed 154 with a private key 120 associated with the OCSP responder 105 to verify the validity of the OCSP response. Once OCSP responses 124 are generated 153 and signed 154, they are transmitted to the relying party device 110 that requested them.

Figure 2:
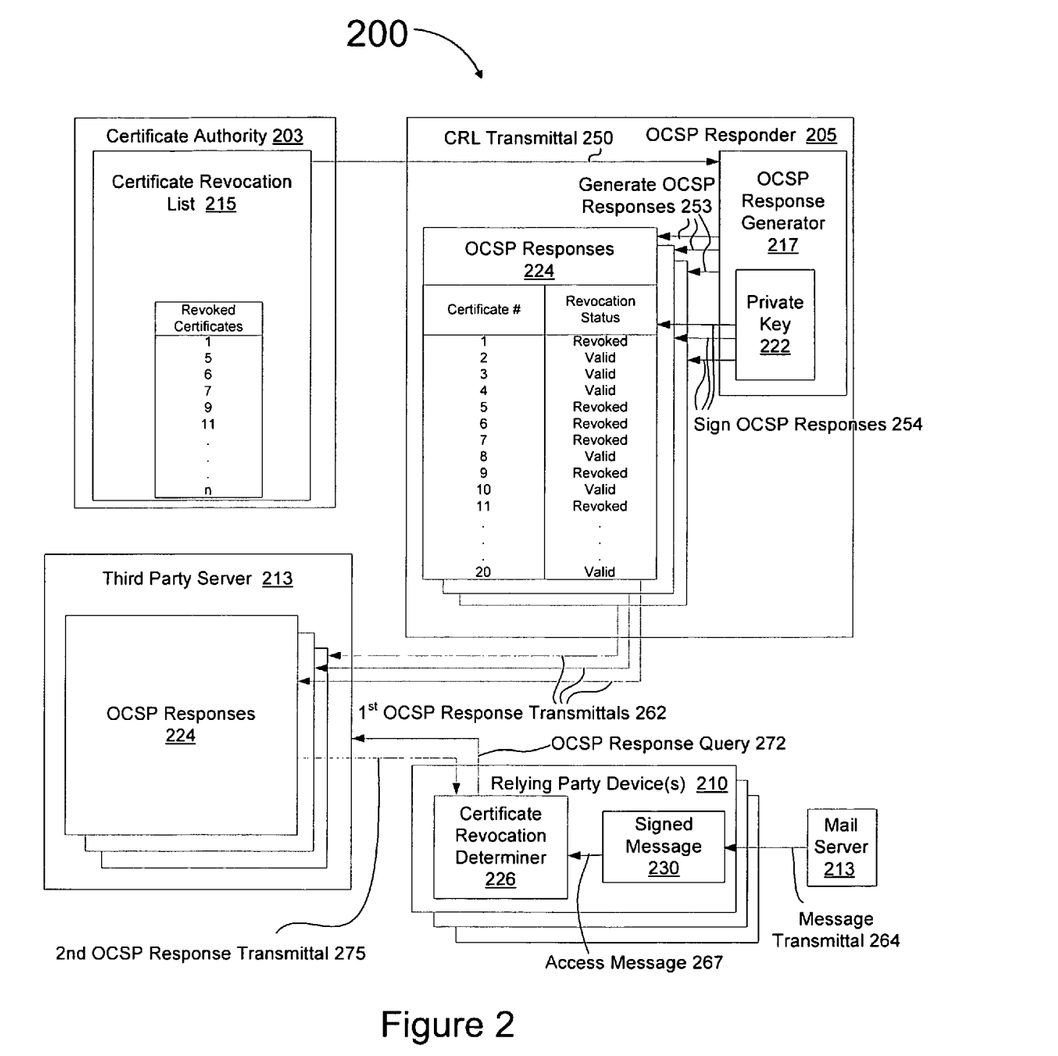
FIG. 2 illustrates a block diagram of a conventional PKI architecture.

A third conventional method for propagating certificate revocation information to clients is illustrated in FIG. 2. In the third conventional method, a CA 203 transmits a CRL 215 to an OCSP responder 205. The OCSP responder 205 generates OCSP responses 253 with an OCSP response generator 217, and digitally signs them 254 with a private key 222. The OCSP responses 224 are generated and signed once a day before client queries are made, and are referred to as pre-signed OCSP responses. Each pre-signed OCSP response includes revocation status information for twenty sequentially numbered certificates. Pre-signed OCSP responses 224 are transmitted 262 to third party servers 213.

A relying party device 210 receives a message transmittal 264 from a mail server 213, the contents of which include a signed message 230. A certificate revocation determiner 226 accesses the signed message 230 to check whether a certificate that was used to generate a cryptographic signature on the signed message 230 has been revoked. This is accomplished by sending an OCSP response query 272 to one of the third party servers 213 regarding the certificate in question. The third party server that receives the OCSP response query 272 transmits a pre-signed OCSP response that includes an entry for the certificate inquired about.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein is a method and apparatus for propagating certificate revocation information. In one embodiment, a certificate revocation list is received that includes a plurality of entries, each entry indicating a revocation status for a certificate. The plurality of entries are grouped other than by order of appearance in the certificate revocation list. Each group includes entries pertaining to a plurality of users. Certification statements are generated based on the grouped entries. In one embodiment, the certification statements are OCSP responses.

In the following description, numerous specific details are set forth such as examples of specific systems, languages, components, etc. in order to provide a thorough understanding of the present invention. It will be apparent, however, to one skilled in the art that these specific details need not be employed to practice the present invention. In other instances, well known materials or methods have not been described in detail in order to avoid unnecessarily obscuring the present invention.

The present invention includes various steps, which will be described below. The steps of the present invention may be performed by hardware components or may be embodied in machine-executable instructions, which may be used to cause a general-purpose or special-purpose processor programmed with the instructions to perform the steps. Alternatively, the steps may be performed by a combination of hardware and software.

The present invention may be provided as a computer program product, or software, that may include a machine-readable medium having stored thereon instructions, which may be used to program a computer system (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnetic or optical cards, flash memory, or other type of media/machine-readable medium suitable for storing electronic instructions.

Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Herein below, embodiments of the invention are discussed that optimize distribution of certificate revocation information using Online Certificate Status Protocol ("OCSP," described in Internet Engineering Task Force ("IETF") Request for Comments ("RFC") document number 2560, published June 1999). Specific embodiments discuss OCSP responses, OCSP responders, and relying parties (OCSP clients). However, embodiments of the present invention may use other protocols for the distribution of certificate information as well. In such alternative protocols, certification statements other than OCSP responses may be used, servers may be other than OCSP responders, and clients are not limited to OCSP clients. Examples of alternative protocols that may be used by embodiments of the present invention include, but are not limited to, certificate management protocol (CMP), XML key management specification (XKMS), and simple certificate validation protocol (SCVP).

Figure 3:
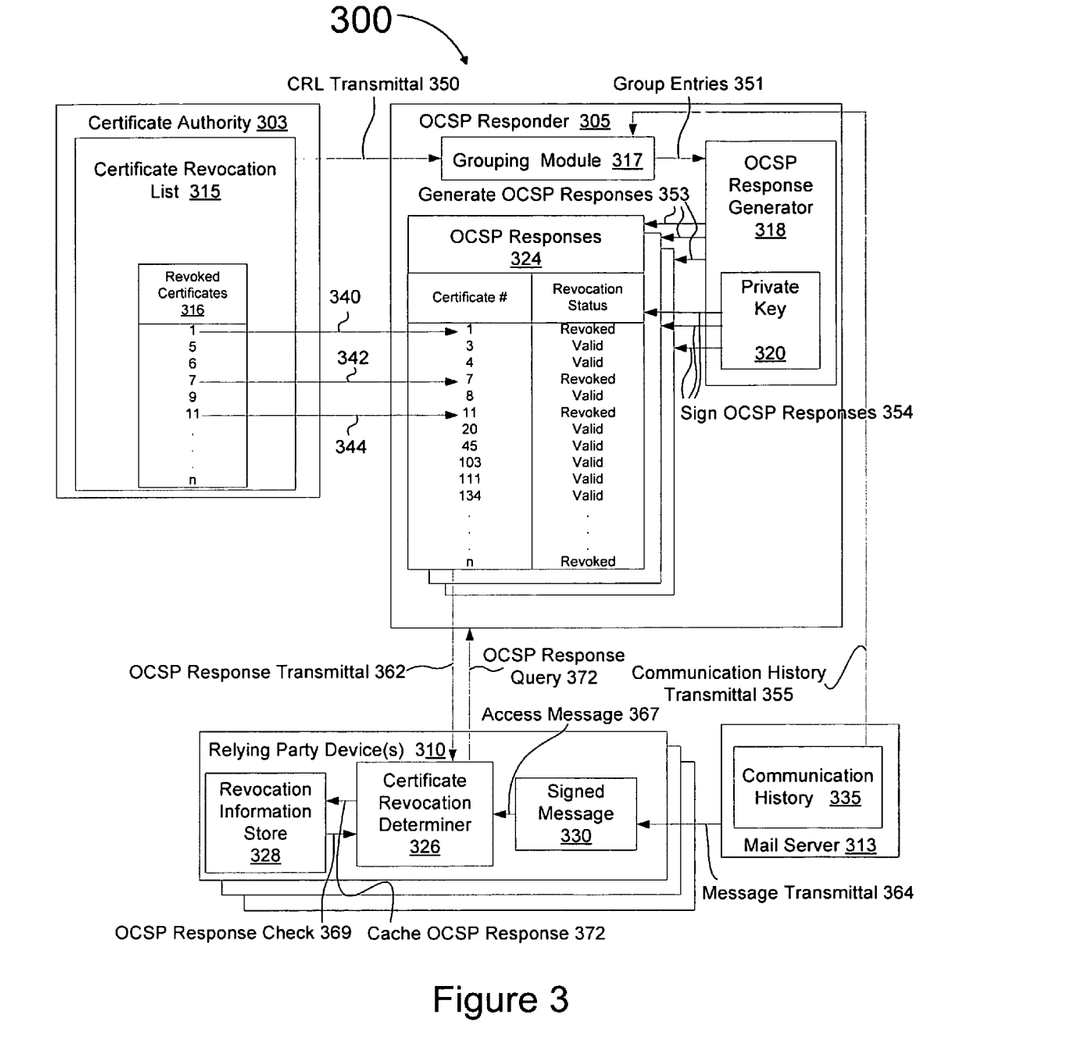
FIG. 3 illustrates a diagrammatic representation of one embodiment of an exemplary PKI architecture.

FIG. 3 illustrates an exemplary PKI architecture 300 in which embodiments of the present invention can be implemented. The PKI architecture 300 may include a certificate authority (CA) 303, an OCSP responder 305, relying parties 310 and a mail server 313, connected through a private or public network, examples of which include the Internet, an intranet, a local area network, etc. The CA 303 is a trusted server that generates digital certificates for individuals, the digital certificates verifying the identity of the individuals holding the certificates. The OCSP responder 305 is a server that has been granted authority by the CA 303 to distribute certificate revocation information to relying parties 310. Alternatively, the OCSP responder 305 may also be a server that a relying party device 310 trusts to accurately report on certificate revocation information, even though the server has not been granted authority by the CA 303. Relying party devices 310 are OCSP clients that need to rely on a certificate, such as recipients of signed messages or web servers accepting secure sockets layer (SSL) client messages.

The certificate authority 303 periodically generates a certificate revocation list (CRL) 315 that includes all revoked certificates 316 in a specified range of certificates. An exemplary CRL 115 is shown that includes certificate revocation status for certificates 1 through n. Only certificates that have been revoked are included in the CRL 115. The validity of a certificate can thus be inferred by an absence from the CRL 115. The CRL 115 can be generated daily, or on a different periodic basis, such as twice a day, hourly, every half hour, etc. The CRL 115 can include information on when the next update will be provided. The release of a new update renders older versions of a CRL 115 obsolete. Increased frequency of CRL generation can increase the reliability of certificates at the cost of additional bandwidth and processing requirements.

Each time a new CRL 315 is generated by the CA 303, it may be transmitted 350 to the OCSP responder 305. The OCSP responder 305 may include a grouping module 317 and an OCSP response generator 317. The grouping module 317 may group entries from the CRL 315 (indicating revoked certificates) together with additional entries that indicate valid certificates, according to grouping criteria. The grouping criteria may pertain to auxiliary data in addition to, or instead of, a user identifier or order of appearance in the certificate revocation list. In particular, auxiliary data may include information contained in the certificate, as well as other data not directly related to or contained in the certificate itself. The auxiliary data may include dynamic auxiliary data and/or static auxiliary data. Dynamic auxiliary data includes data that is capable of frequent change, such as certificate request history and communication history 335. Static auxiliary data includes data that changes relatively infrequently, such as office location, department members, company employees, etc.

Different groupings can be used for each relying party, or the same grouping can be used for multiple relying parties (e.g. all relying parties). The number of entries in a group can be fixed or variable. Groups can range in size from as few as two entries to hundreds of entries or more.

In certain embodiments, the grouping module 317 may interact with or collect information from an electronic mail server 313 to help select useful certificate groupings. For example, historical data about user communication history 335 may be collected and used, as described below with reference to FIG. 6. In the exemplary PKI architecture of FIG. 3, mail server 313 may transmit 355 a communication history 335 to the OCSP responder 305. The grouping module 317 may access the communication history 335 and use it to group entries 351 in multiple fashions.

Public key infrastructures often implement trust chains, where one entity is trusted to certify another entity, which is in turn trusted to certify a third entity, and so on. When an end user attempts to validate a certificate issued by the third entity, he is likely to request validity information about the second and first entities as well. In one embodiment, some groups contain revocation status information about each of the certificates in a chain, allowing the end user to make only a single query to validate the certificates in an entire chain.

Individuals can be issued more than one certificate. For example, it is not uncommon for an individual to be issued a separate signing and encryption certificate. Multiple certificates belonging to one or a few individuals may be grouped together to increase efficiency. This can be beneficial since parties requesting information on one certificate for a user are likely to request information for other certificates from the same user (assuming the user has multiple certificates).

Entries may be grouped to include all employees of a company, or all employees that work at a specific office location, or within a specific department, for example. Such groupings can be useful where individuals are likely to correspond with multiple parties within a company, office, location, department, etc.

The above mentioned grouping strategies are provided by way of example and not as limitations. Other methods of grouping certificate entries may also be used in alternative embodiments of the present invention. Some or all of the above mentioned grouping strategies may be combined to reduce the number of queries regarding certificate revocation information. For example, an OCSP response may be generated dynamically for a relying party device based on auxiliary data including all certificates requested by the relying party device in the last 48 hours, all individuals communicated with in the past week, and all fellow employees that work in the same office. This would likely reduce the number of inquiries made to the OCSP responder 105 by the relying party device.

Referring back to FIG. 3, once the grouping module 317 has grouped entries 351, OCSP responses 324 are generated by the OCSP response generator 318. OCSP responses may include response type, time at which response was computed, an expiry time for the OCSP response, a digital signature algorithm identifier of the OCSP responder 305, certificate number(s), whether certificate(s) are valid or revoked, a digital signature of the OCSP responder 305, etc. OCSP responses 324 may be generated dynamically upon client request, or they may be generated prior to any client request (known as pre-computed or pre-signed OCSP responses).

OCSP responses 324 include the revocation status for each certificate that has an entry therein. In one of the exemplary OCSP responses 324, entries for certificates 1, 7 and 11 from the certificate revocation list 315 are inserted 340, 342 and 344, respectively. The exemplary OCSP response 324 also includes entries for valid certificates 3, 4, 8, 20, and so on.

OCSP responses may contain revocation information on one or more groups. Multiple OCSP responses may contain revocation information for the same certificates, and/or the same groups. For example, information for certificate 7 may be included in an OCSP response that includes certificate revocation information for all employees of a specific company, and it may also be included in an OCSP response that includes certificate revocation information for all individuals who have sent email to a specific entity in the past 48 hours.

When there are multiple OCSP responses that may or do contain information about the same certificate, the OCSP responder may choose which OCSP response to provide according to a relying party device's preferences, a predefined algorithm, prior relying party selection, or in accordance with other criteria. Alternatively, the OCSP responder may provide the relying party device with a list of possible OCSP responses, from which the relying party can select one or more to receive. If the selected OCSP responses have not already been generated, they can be generated upon being selected.

Once the OCSP responses 324 are generated, they are digitally signed 354 with a private key 320. The private key is part of a public key pair that is associated with the OCSP responder 305. The digital signature verifies the OCSP responder 305 as the OCSP response source, and ensures that the contents of the OCSP response are accurate and can be trusted.

Relying part devices 310 may receive a signed mail message 330 from the mail server 313. In order to verify the digital signature, the revocation status should be checked, such as by inquiry to an OCSP responder 305. Other signed data may also be received, and it may originate from sources other than a mail server 313, such as third party servers. Certificate revocation determiner 326 accesses the message 367 to determine what certificate was used to sign it. The certificate revocation determiner 326 then performs an OCSP response check 369 to see if an OCSP response including revocation information for the certificate in question is cached in a revocation information store 328. The revocation information store may be, for example, a local cache, a remote cache, or a buffer, that stores previously received OCSP responses and/or the information contained in them.

When revocation information for the certificate in question is not found, the certificate revocation determiner 326 makes an OCSP response query 372 to the OCSP responder 305 for that certificate. The OCSP responder 305 replies with an OCSP response transmittal 362 including an OCSP response for the queried certificate. The OCSP responses 324 may be cached 372 in the revocation information store 328 and reviewed to determine a revocation status for the certificate. If the certificate is valid, then the contents of the message can be trusted. If the certificate has been revoked, then the contents of the message are of doubtful credibility, and the message sender should be informed.

OCSP responses 324 may be valid for a relatively short period, after which they become obsolete. In one embodiment, OCSP responses are cleared from the revocation information store 328 when they become obsolete. Alternatively, the revocation information store 328 may be cleared of obsolete OCSP responses 324 on a periodic basis such as daily, weekly, monthly, etc. to free up storage capacity.

Figure 4:
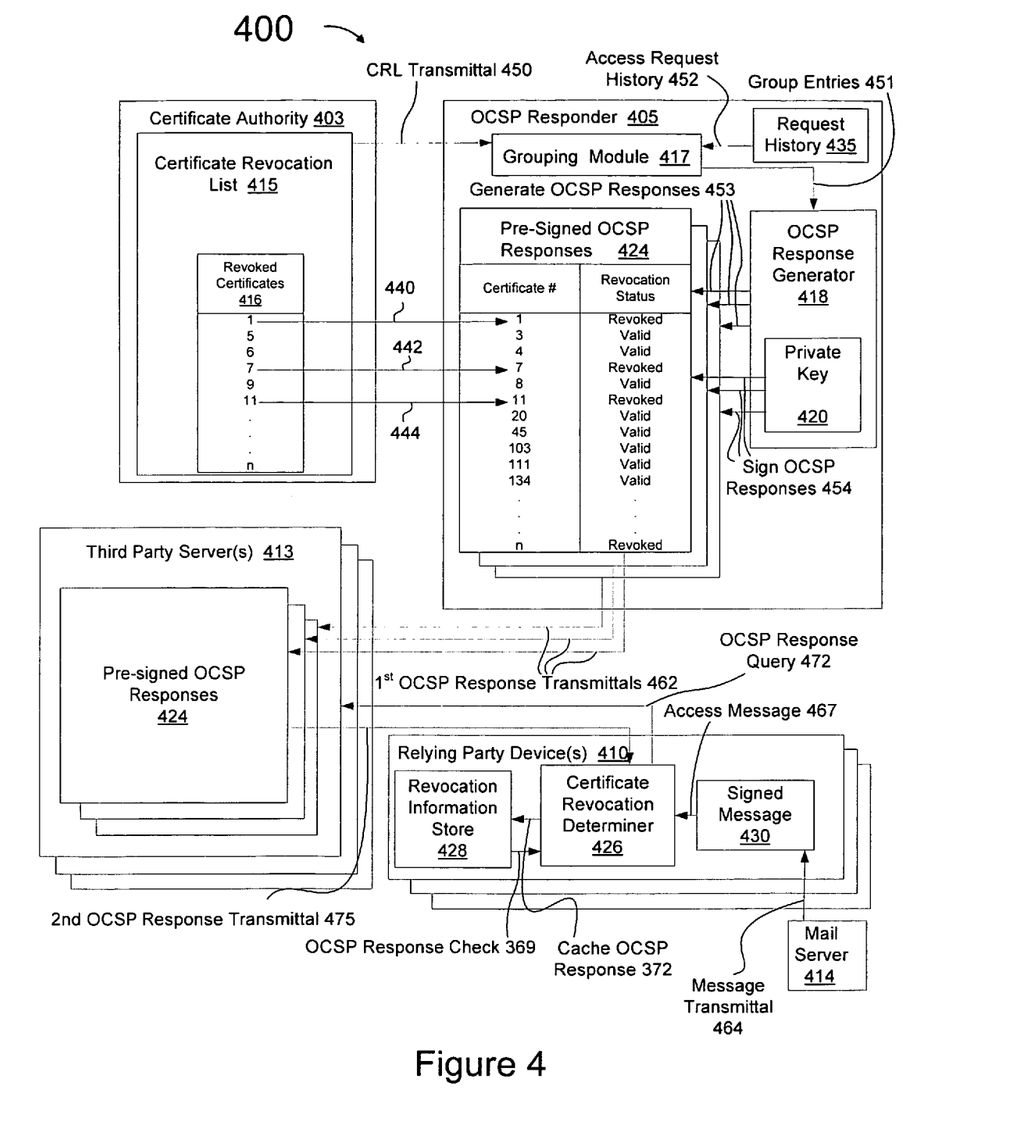
FIG. 4 illustrates a diagrammatic representation of one embodiment of an exemplary PKI architecture.

FIG. 4 illustrates one embodiment of an exemplary PKI architecture 400 for the propagation of certificate revocation information. The PKI architecture 400 may include a certificate authority 403, an OCSP responder 405, one or more third party servers 413, one or more relying party devices 410 and a mail server 414. The CA 403 generates a CRL 415 and transmits the CRL 450 to an OCSP responder 405. The OCSP responder 405 may include a grouping module 417, a request history 435, and a OCSP response generator 418. The grouping module 417 generates certificate groups as discussed above in reference to FIG. 3. In one embodiment, the grouping module 417 uses a request history 435 to group certificate entries 451, such as by popularity, recent requests, etc, as discussed in greater detail below with reference to FIG. 7. Alternatively, other dynamic or static auxiliary data may be used to group certificate entries 451.

The OCSP response generator 418 uses the groups to generate OCSP responses 453. A private key 420 associated with the OCSP responder 405 is used to digitally sign the OCSP responses 454. OCSP responses can be generated and signed without first receiving OCSP response queries. These OCSP responses, known as pre-signed OCSP responses, can be distributed to a plurality of third party servers 413 via first OCSP response transmittals 462.

In one embodiment, the third party servers 413 do not need to be authorized by the CA 403 to distribute certificate revocation status information to relying party devices 410 since the pre-signed OCSP responses 424 are digitally signed by the OCSP responder 405 before transmittal. Moreover, the first OCSP response transmittals 462 need not be secured since possible interception of pre-signed OCSP responses is harmless. Thus, the third party servers 413 may act as simple distribution points for pre-signed OCSP responses 424.

Relying party devices 410 may include a certificate revocation determiner 426 and a revocation information store 428. Upon relying party devices 410 receiving a signed message 430 from the mail server 414, the certificate revocation determiner 426 may check to determine whether the digital signature on the signed message 430 can be trusted. First, an OCSP response check 369 is made on the revocation information store 428. If an OCSP response containing revocation information on the certificate used to create the signed message is present in the revocation information store 428, and its status is current, then revocation status is determined from the stored OCSP response. If revocation status cannot be found in the revocation information store 428 for the certificate in question, then an OCSP response query 472 is sent to one of the third party servers 413 regarding that certificate. The OCSP response query 472 to a third party server 413 may alternatively be made without first checking the revocation information store 428. The OCSP response query 472 may also be made directly to the OCSP responder 405.

A second OCSP response transmittal 475 sends one or more pre-signed OCSP responses 424 having an entry for the queried certificate to the requesting relying party device. The received pre-signed OCSP response can then be cached 372 in the revocation information store 428. The OCSP response can also be checked to determine the revocation status of the certificate in question to determine whether or not to trust the contents of the signed message 430.

Figure 5:
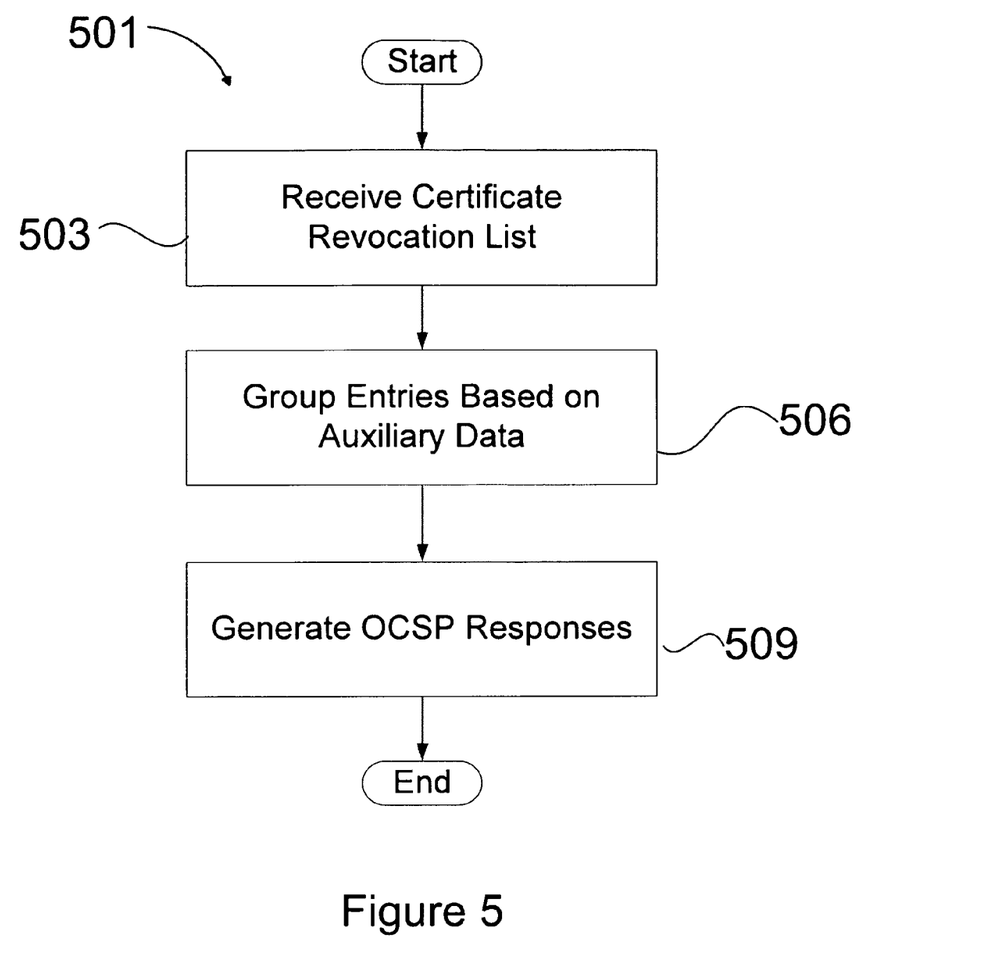
FIG. 5 illustrates a flow diagram of one embodiment of a method for propagating certificate revocation information.

FIG. 5 illustrates one embodiment of a method 501 for propagating certificate revocation information. The method may be performed by processing logic that may comprise hardware (e.g., circuitry, dedicated logic, programmable logic, microcode, etc.), software (such as instructions run on a processing device), or a combination thereof. In one embodiment, method 501 is performed by OCSP responder 305 of FIG. 3 and/or OCSP responder 405 of FIG. 4.

Referring to FIG. 5, method 501 begins with block 503, in which a certificate revocation list (CRL) is received from a certificate authority. The certificate revocation list includes a plurality of entries, each entry corresponding to a digital certificate, and indicating that the certificate has been revoked. At block 506, entries from the CRL are grouped together. In addition to entries for the CRL, the groups may also include entries for digital certificates that have not been revoked. These certificates can be inferred from the CRL.

Groups can be formed based on grouping criteria such as auxiliary data. The auxiliary data can be gathered by an OCSP responder or from external sources such as mail servers, web servers, and so on. Groupings may be formed to reduce the number of queries made to determine certificate revocation information. Groupings may also improve and/or optimize a cache hit ratio for OCSP responses, wherein the cache hit ratio refers to the ratio between the number of times revocation information for digital certificates is sought and the number of times OCSP response queries are made. For a more detailed discussion on grouping techniques, see the above discussion at FIG. 3.

At block 509, the groups are used to generate OCSP responses. Each OCSP response can include multiple certificate entries based on the group or groups contained therein. OCSP responses may be digitally signed upon creation with a single digital signature to verify their authenticity. The OCSP responses can be pre-computed (pre-signed) OCSP responses or OCSP responses that are generated in real time upon request. Pre-signed OCSP responses may be distributed to unsecure web servers to facilitate efficient distribution to relying parties. Upon request, OCSP responses are transmitted to relying party devices, whether they have been pre-computed or are computed at the time of request.

Figure 6:
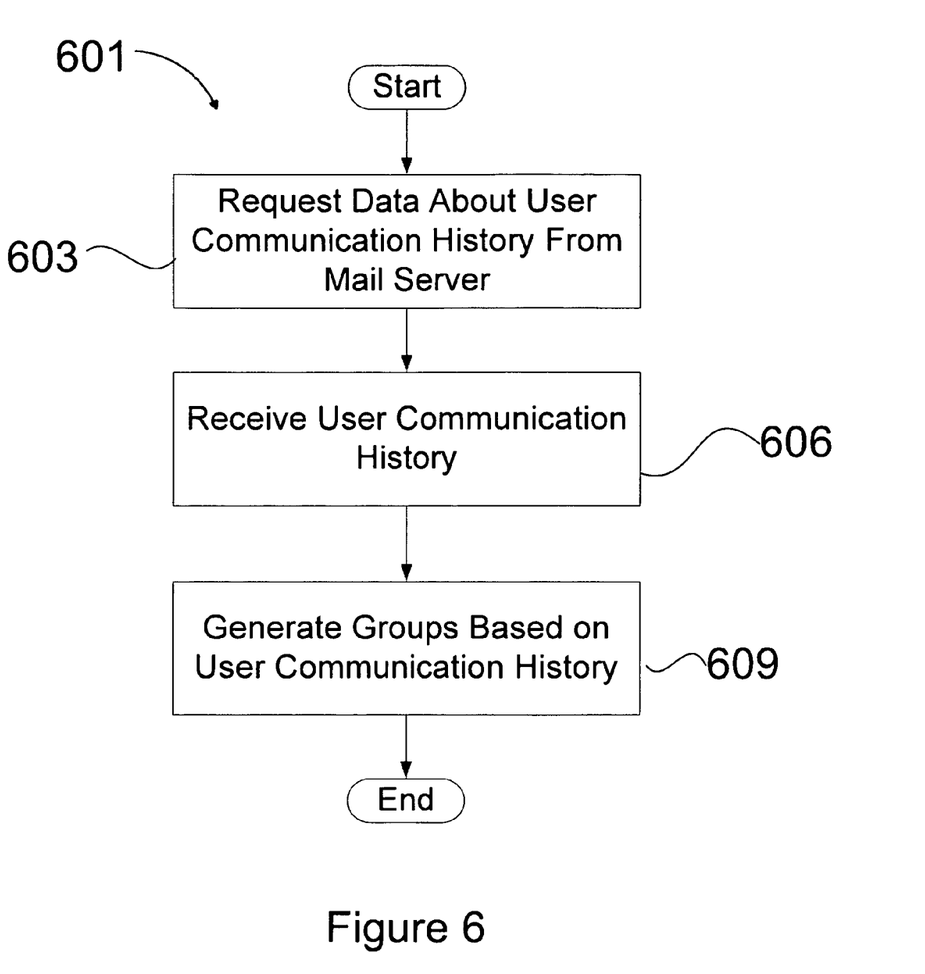
FIG. 6 illustrates a flow diagram of one embodiment of a method for grouping certificate entries.

FIG. 6 illustrates one embodiment of a method 601 for forming groups of certificate entries. In one embodiment, method 601 is performed by block 506 of FIG. 5.

Referring to FIG. 6, data about user communication history is requested from a mail server at block 603. At block 606, the user communication history is received. At block 609, groups are generated based on the user communication history.

The communication history may be organized in the form of a graph, table, matrix or other data structure that can indicate social networks. Social network data may be used to generate efficient certificate groupings.

In one embodiment, the communication history is used to group certificate status information based on type of email communication, so that certificates corresponding to individuals that commonly exchange secure communication are grouped together. Communication history can also be used to create user-centric groups that include entries for those certificates belonging to correspondents that an individual user commonly communicates with. In one embodiment, if a sender transmits mail to a collection of recipients, then revocation information requests for the sender's certificate revocation status information made for a period of time after the message is sent may also return certificate status information for the recipients. This may help eliminate secondary revocation information requests as the recipients respond to the sender or communicate among themselves.

Figure 7:
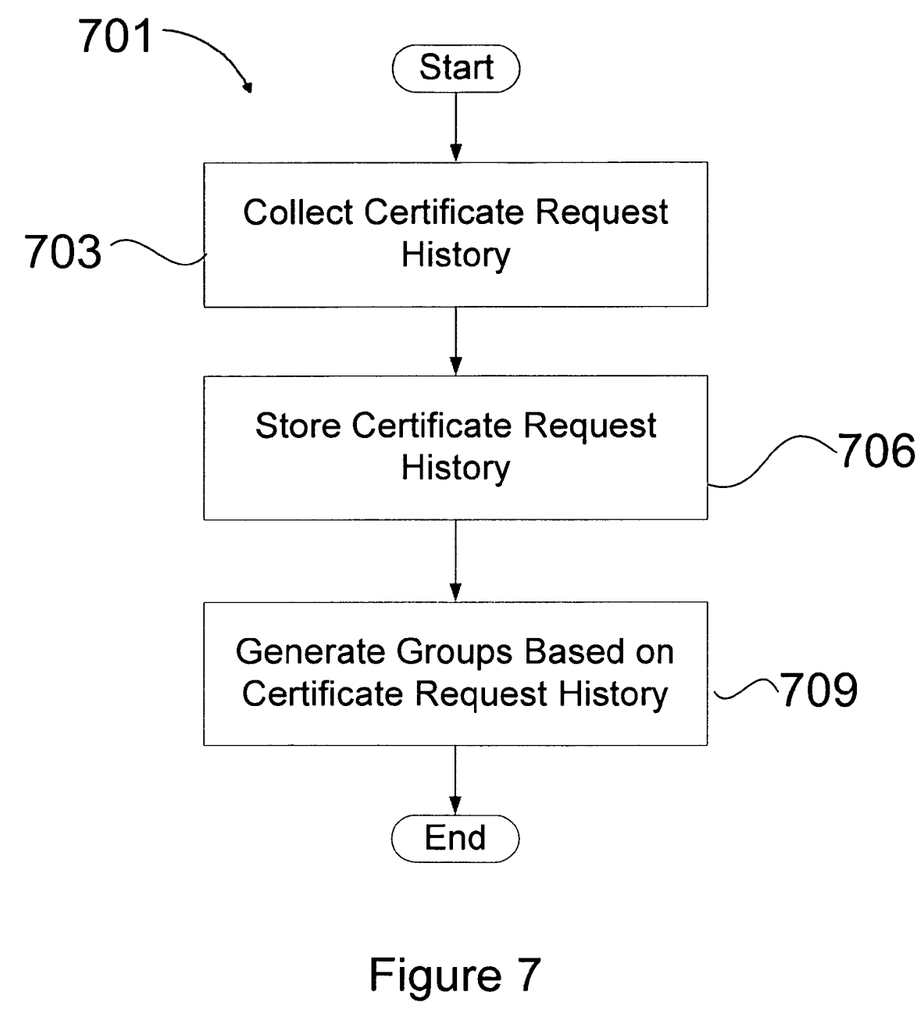
FIG. 7 illustrates a flow diagram of one embodiment of a method for grouping certificate entries.

FIG. 7 illustrates one embodiment of a method 701 for forming groups of certificate entries. In one embodiment, method 701 is performed by block 506 of FIG. 5.

Referring to FIG. 7, certificate request history is collected (block 703). In one embodiment, the certificate request history may be collected on a continuing basis as certificate requests are made. For example, an OCSP Responder may keep track of certificate request history for all or some certificates. In one embodiment, at least some of the certificate request history is gathered from external sources, such as external OCSP responders, third party servers, or certificate authorities.

At block 706, the certificate request history is stored. The request history may be stored locally or externally. The certificate request history may include information such as the requester of a certificate (e.g., IP address of the requester), the number of times a certificate has been requested by the relying party devices, the number of times a specific relying party has requested one or more certificates, etc. This information can be organized in a data structure (e.g. table, tree, matrix, etc.) to show certificate request patterns.

At block 709, groups are generated based on the certificate request history. In one embodiment, groups are formed based on the frequency of certificate revocation requests. Certificates that are inquired about infrequently can be combined into "unpopular" groups, and certificates that are inquired about frequently can be combined into "popular" groups. The unpopular groups may include many certificates to reduce signing overhead without significantly impacting clients. The popular groups may include fewer certificates to facilitate fast download times.

In one embodiment, the certificate request history is used to place information about popular certificates in multiple (possibly many) different groups. This can result in fewer requests for validity information about those popular certificates (since certificate revocation information for the popular certificates may be included when revocation information on other certificates is made). The popular certificates may continue to be included in many groups until their popularity begins to decline. An embodiment can adjust thresholds for values corresponding to popularity and rate of popularity decay so that certificate information groups reach a steady state where OCSP responses provide extra certificate revocation status information that is useful more often than simple numerical or random grouping.

In an embodiment, the certificate request history is analyzed to determine certificates that are often requested together. For example, the certificate request history may indicate that clients that request information for certificate A often request information for certificate B. Grouping module 317 may use this information to place an entry for certificate B in all groups that contain an entry for certificate A.

The certificate request history may also indicate past requests made by specific relying party devices (e.g. specific IP addresses). For each indicated relying party device, a group may be formed that includes entries for all certificates having been recently requested and/or for certificates that are often requested by that relying party device. When the relying party device for which the group has been generated requests the revocation status on a certificate, revocation status information is returned for all of the entries in the group. This can significantly reduce the number of inquiries for certificate revocation status that a relying party device makes.

Figure 8:
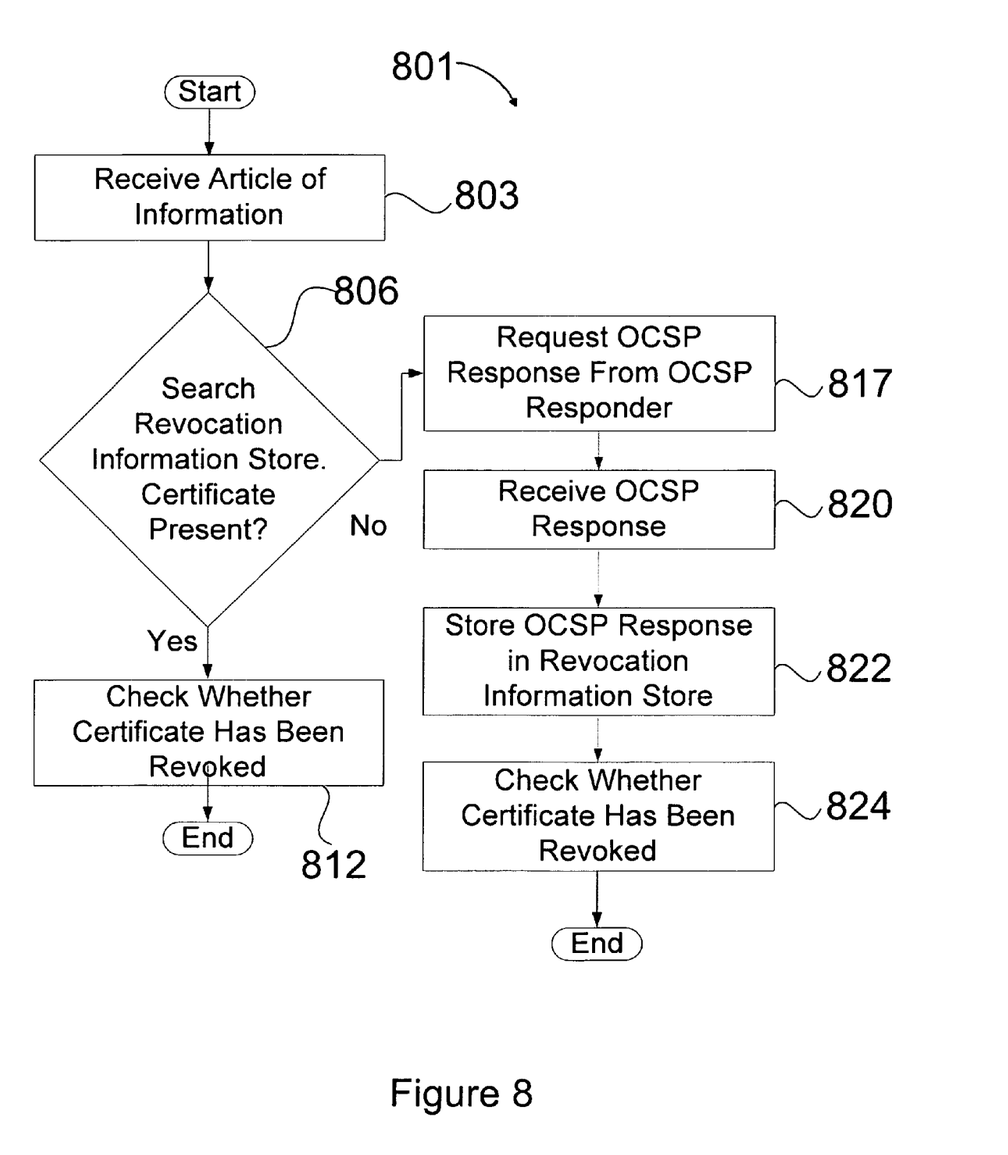
FIG. 8 illustrates a flow diagram of one embodiment of a method for determining the revocation status of a digital certificate.

FIG. 8 illustrates one embodiment of a method 801 for determining the revocation status of a digital certificate. The method may be performed by processing logic that may comprise hardware (e.g., circuitry, dedicated logic, programmable logic, microcode, etc.), software (such as instructions run on a processing device), or a combination thereof. In one embodiment, method 801 is performed by relying party devices 310 of FIG. 3 and/or relying party devices 410 of FIG. 4.

Referring to FIG. 8, method 801 begins with block 803, in which an article of information is received. The article of information may be a digitally signed electronic message received from a mail server, or other data secured via a digital certificate. The article of information may be received upon request, or may be received automatically without user interaction.

At block 806, a revocation information store is searched for revocation information regarding a digital certificate that was used to digitally sign or otherwise secure the article of information. The revocation information store may be a local storage unit (e.g. a local cache) maintained by a relying party device, or it may be an external storage unit maintained by a server, client, or other entity. When the certificate is present in the revocation information store, its revocation status is checked (block 812), and the method 801 finishes.

When the certificate is not present in the revocation information store, an OCSP response that includes revocation information on the certificate in question may be requested from an OCPS responder (block 817). Alternatively, a pre-computed OCSP response including revocation information on the certificate may be requested from a third party server. At block 820 an OCSP response for the queried certificate is received, at block 822 it is cached in the revocation information store, and at block 824 it is checked to determine the revocation status on the requested certificate. The received OCSP response may also include revocation information on unrequested digital certificates that the requester is likely to inquire about in the future. The selection of which certificates to include in the OCSP response along with the requested certificate can be based on grouping criteria such as auxiliary data, as discussed in reference to FIG. 3.

Figure 9:
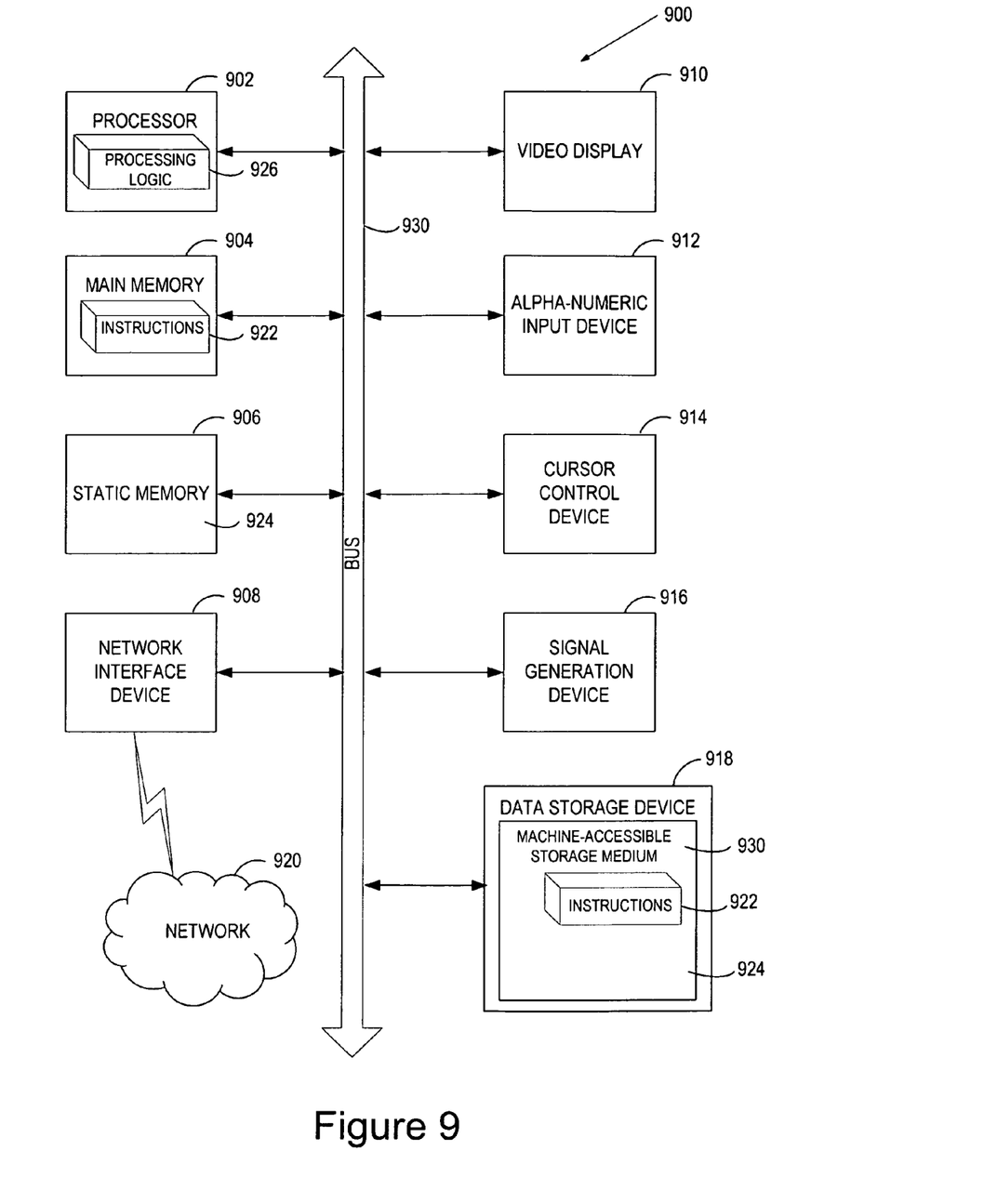
FIG. 9 illustrates a diagrammatic representation of a machine in the exemplary form of a computer system, in accordance with one embodiment of the present invention.

FIG. 9 illustrates a diagrammatic representation of a machine in the exemplary form of a computer system 900 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. While only a single machine is illustrated, the term "machine" shall also be taken to include any collection of machines that individually or jointly execute a set (or multiple sets) of instructions to perform any one or more of the methodologies discussed herein.

The exemplary computer system 900 includes a processing device 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a data storage device 918, which communicate with each other via a bus 930.

Processing device 902 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 902 is configured to execute the processing logic 926 for performing the operations and steps discussed herein.

The computer system 900 may further include a network interface device 908. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 916 (e.g., a speaker).

The data storage device 918 may include a machine-accessible storage medium 930 on which is stored one or more sets of instructions (e.g., software 922) embodying any one or more of the methodologies or functions described herein. The software 922 may also reside, completely or at least partially, within the main memory 904 and/or within the processing device 902 during execution thereof by the computer system 900, the main memory 904 and the processing device 902 also constituting machine-accessible storage media. The software 922 may further be transmitted or received over a network 920 via the network interface device 908.

While the machine-accessible storage medium 930 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

Thus, a method and apparatus for creating new software packages in a second package format from original software packages in a first package format have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method, comprising:
   receiving, by a computer system executing a server that distributes certificate revocation information, a certificate revocation list that includes a plurality of revocation status entries, each revocation status entry indicating a revocation status for a digital certificate;
   grouping the plurality of revocation status entries based on one or more indicators that identify revocation status entries that are likely to be queried together, wherein the revocation status entries are grouped other than by order of appearance in the certificate revocation list based at least in part on auxiliary data not contained in the digital certificate, and wherein each group includes revocation status entries pertaining to a plurality of users; and
   generating certification statements based on the grouped revocation status entries.

2. The method of claim 1, wherein the certificate revocation list is received from a certificate authority, and wherein the server that distributes certificate revocation information is an OCSP responder.

3. The method of claim 1, further comprising:
   transmitting a certification statement to a client in response to a request for the revocation status of a digital certificate that corresponds to an entry in the certification statement.

4. The method of claim 1, further comprising:
   transmitting the certification statements to a third party server.

5. The method of claim 1, wherein the entries are grouped based on dynamic auxiliary data, the dynamic auxiliary data comprising at least one of previous revocation request history or previous communication history.

6. The method of claim 1, wherein the entries are grouped based on static auxiliary data, static auxiliary data comprising at least one of office location, department identification, or personal contact information.

7. The method of claim 1, wherein the certification statements are pre-signed OCSP responses that are generated without a preceding client request.

8. The method of claim 1, wherein the certification statements are OCSP responses that are generated dynamically upon client request.

9. The method of claim 1, wherein each of the certification statements have a single cryptographic signature.

10. A computer-implemented method, comprising:
    receiving, by a relying party device, an article of information signed with a digital certificate;
    searching a local revocation information store for cached certification statements that include the digital certificate by the relying party device, wherein the certification statements each comprise a group including a plurality of entries combined based on one or more indicators that identify revocation status entries that are likely to be queried together, wherein the certification statements are grouped other than by order of appearance in a certificate revocation list based at least in part on auxiliary data not contained in the digital certificate, and wherein each group includes entries pertaining to a plurality of users; and
    when the digital certificate is present in a cached certification statement, determining whether the certificate has been revoked based on the cached certification statement.

11. The method of claim 10, further comprising:
    when the digital certificate is not present in a cached certification statement, requesting from a first server a certification statement that includes revocation status for the digital certificate, receiving the certification statement, caching the certification statement in the local revocation information store, and determining whether the digital certificate has been revoked based on the stored certification statement.

12. The method of claim 10, wherein the article of information comprises an email message.

13. The method of claim 10, wherein the certification statements are OCSP responses.

14. The method of claim 10, wherein the plurality of entries are combined based on auxiliary data, the auxiliary data including information not contained in a digital certificate.

15. The method of claim 10, further comprising:
    discarding contents of the local revocation information store based on expiration data associated with the cached certification statements.

16. A non-transitory machine-accessible storage medium including data that, when accessed by a machine, cause the machine to perform a method comprising:
    receiving, by a computer system executing a server that distributes certificate revocation information, a certificate revocation list that includes a plurality of revocation status entries, each revocation status entry indicating a revocation status for a digital certificate;
    grouping the plurality of revocation status entries based on one or more indicators that identify revocation status entries that are likely to be queried together, wherein the revocation status entries are grouped other than by order of appearance in the certificate revocation list based at least in part on auxiliary data not contained in the digital certificate, and wherein each group includes revocation status entries pertaining to a plurality of users; and
    generating certification statements based on the grouped revocation status entries.

17. The non-transitory machine-accessible storage medium of claim 16, wherein the certificate revocation list is received from a certificate authority, and wherein the server that distributes certificate revocation information is an OCSP responder.

18. The non-transitory machine-accessible storage medium of claim 16, wherein the method further comprises:
    transmitting a certification statement to a client in response to a request for the revocation status of a certificate that corresponds to an entry in the certification statement.

19. The non-transitory machine-accessible storage medium of claim 16, wherein the method further comprises:
transmitting the certification statements to a third party server.

20. The non-transitory machine-accessible storage medium of claim 16, wherein the entries are grouped based on dynamic auxiliary data, the dynamic auxiliary data comprising at least one of previous revocation request history or previous communication history.

21. The non-transitory machine-accessible storage medium of claim 16, wherein the entries are grouped based on static auxiliary data, static auxiliary data comprising at least one of office location, department identification, or personal contact information.

22. The non-transitory machine-accessible storage medium of claim 16, wherein the certification statements are pre-signed OCSP responses that are generated without a preceding client request.

23. The non-transitory machine-accessible storage medium of claim 16, wherein the certification statements are OCSP responses that are generated dynamically upon client request.

24. A non-transitory machine-accessible storage medium including data that, when accessed by a machine, cause the machine to perform a method comprising:
receiving an article of information signed with a digital certificate;
searching a local revocation information store for cached certification statements that include the digital certificate, wherein the certification statements each comprise a group including a plurality of entries combined based on one or more indicators that identify revocation status entries that are likely to be queried together, wherein the certification statements are grouped other than by order of appearance in a certificate revocation list based at least in part on auxiliary data not contained in the digital certificate, and wherein each group includes entries pertaining to a plurality of users; and
when the digital certificate is present in a cached certification statement, determining whether the digital certificate has been revoked based on the cached certification statement.

25. The non-transitory machine-accessible storage medium of claim 24, wherein the method further comprises:
when the digital certificate is not present in a cached certification statement, requesting from a first server a certification statement that includes revocation status for the digital certificate, receiving the certification statement, caching the certification statement in the local revocation information store, and determining whether the digital certificate has been revoked based on the stored certification statement.

26. The non-transitory machine-accessible storage medium of claim 24, wherein the certification statements are OCSP responses.

27. The non-transitory machine-accessible storage medium of claim 24, wherein the plurality of entries are combined based on auxiliary data, the auxiliary data including information not contained in a digital certificate.

28. A system, comprising:
a first server computer system, to receive a certificate revocation list that includes a plurality of revocation status entries, each revocation status entry indicating a revocation status for a digital certificate, to group the plurality of revocation status entries based on one or more indicators that identify revocation status entries that are likely to be queried together, wherein the revocation status entries are grouped other than by order of appearance in the certificate revocation list based at least in part on auxiliary data not contained in the digital certificate, and wherein each group includes revocation status entries pertaining to a plurality of users, and to generate certification statements based on the grouped revocation status entries.

29. The system of claim 28, further comprising:
a certificate authority, coupled to the first server computer system via a network, to generate the certificate revocation list.

30. The system of claim 28, further comprising:
a client computer system, coupled to the first server computer system via a network, to receive the certification statements, and to store the certification statements.

31. The system of claim 30, wherein the first server computer system is an OCSP responder, the certification statements are OCSP responses, and the client computer system is a relying party device.

* * * * *